May 26, 1964    L. W. NORTHROP ETAL    3,134,684
METHOD OF ADHERING VINYLIDENE CHLORIDE POLYMER TO POLYETHYLENE
Filed Jan. 10, 1963
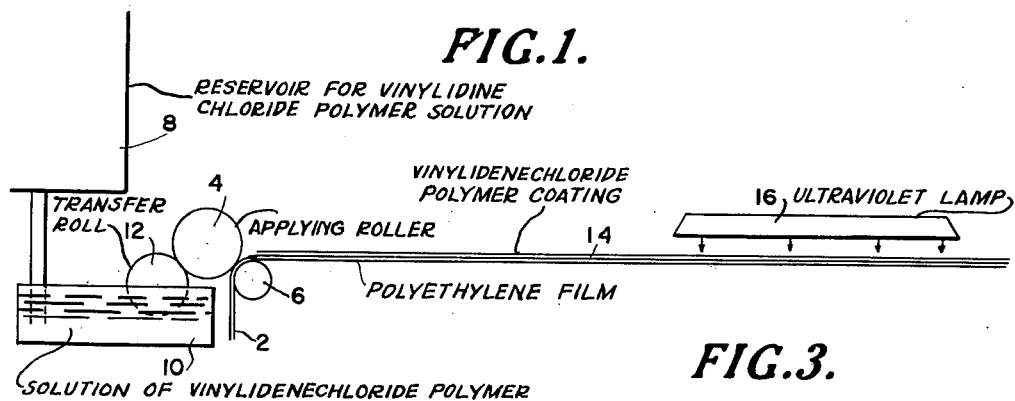
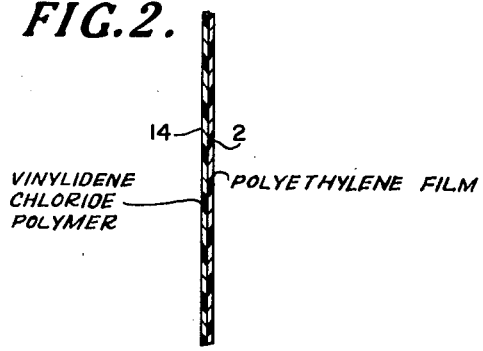
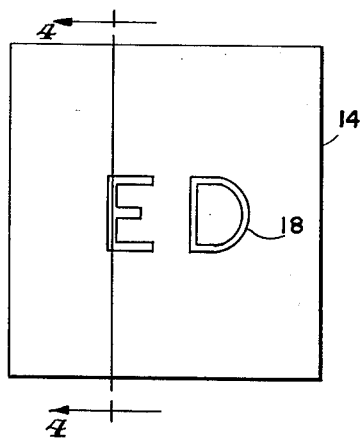
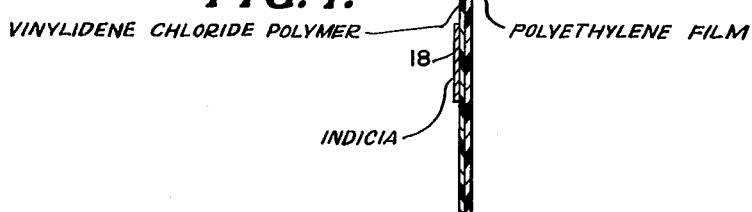
INVENTORS
LILLIAN W. NORTHROP
DONALD S. SCHEUFELE
BY *Cushman, Darby & Cushman*
ATTORNEYS United States Patent Office 3,134,684
Patented May 26, 1964

3,134,684
METHOD OF ADHERING VINYLIDENE CHLORIDE POLYMER TO POLYETHYLENE
Lillian W. Northrop, Coral Gables, Fla., and Donald S. Scheufele, Stoneham, Mass., assignors to W. R. Grace & Co., Cambridge, Mass., a corporation of Connecticut
Filed Jan. 10, 1963, Ser. No. 256,492
17 Claims. (Cl. 117—15)

This application is a continuation-in-part of application Serial No. 829,243, filed July 24, 1959, now abandoned.

The present invention relates to the bonding of saran, i.e., a vinylidene chloride resin, to polyethylene.

Various methods have been proposed for improving the bond of vinylidene chloride polymers to polyethylene. The most common process today is to pretreat the polyethylene with a flame and then apply the vinylidene chloride polymer from solution. This procedure has several drawbacks. It is difficult to maintain the uniform flame required for best results. Furthermore, there is definitely a fire hazard in using a flame. Additionally, unless the flame is carefully adjusted it will burn holes in the polyethylene.

Accordingly, it is an object of the present invention to devise a novel procedure for bonding saran, i.e., a vinylidene chloride polymer, to polyethylene.

A further object is to form an improved saran to polyethylene bond.

Another object is to adhere printing to saran coated polyethylene.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by coating polyethylene with saran and then treating the coated polyethylene with ultraviolet light.

It is surprising that the ultraviolet treatment will accomplish this improved bonding or adhesion since when polyethylene is treated with ultraviolet light and then coated with saran the improved bonding of the present invention is not obtained. This is indeed unexpected as it is known that the use of ultraviolet light will assist in the adherence of printing ink to polyethylene which has been treated with ozone, nitrous oxide, halogens or hydrogen halides. Apparently, the action of ultraviolet light on the combination of polyethylene and saran acts differently than ultraviolet light acts on polyethylene alone.

To secure this increased adhesion of saran to polyethylene, it is important that the amount of ultraviolet light should be between the limits of 280 and 30,000 watt seconds per square foot of surface area of saran coated polyethylene. Preferably, the ultraviolet light is used in an amount of 1000 or more watt seconds per square foot of surface area of the coated polyethylene and most preferably in an amount of at least 5000 watt seconds per square foot of surface area. The use of 500 watt seconds per square foot of surface area can also be used.

If insufficient ultraviolet light is employed, there is no adhesion of the saran to polyethylene. If too much ultraviolet light is employed, then there also is inadequate adhesion. Furthermore, if the irradiation is continued for a longer period of time than that which will impart a treatment of 30,000 watt seconds per square foot of surface area, the saran begins to decompose. In fact, there is a tendency toward yellowing of the saran with only 15,000 watt seconds per square foot of surface area.

The use of large amounts of irradiation has been proposed in Roedel No. 2,484,529 to insolubilize either polyethylene or saran. However, this treatment as stated above also decomposes the saran and is unsuitable for preparing a saran coated polyethylene.

The invention will be better understood in connection with the drawings wherein:

FIGURE 1 is a diagrammatic arrangement of apparatus for carrying out the invention;

FIGURE 2 is a sectional view of saran bonded to polyethylene according to the invention;

FIGURE 3 is a top plan view showing printing applied to saran adhered to polyethylene according to the invention; and FIGURE 4 is a sectional view along the lines 4—4 of FIGURE 3.

Referring more specifically to FIGURE 1 of the drawings, polyethylene film 2 (e.g., Alathon 14, molecular weight 20,000, density 0.914) is drawn between rolls 4 and 6. Saran F–120, 200 cps. as a 15% solution in methyl ethyl ketone (vinylidene chloride-acrylonitrile copolymer containing a major amount of vinylidene chloride) is supplied from reservoir 8 to coating tank 10. The solution is transferred in conventional fashion from roll 12 to roll 4 from which it is applied to the polyethylene. The polyethylene film 2 having a coating 14 of the saran is then passed under ultraviolet lamp 16, e.g., for 3 seconds at a distance of 7 inches from a 3,000 watt ultraviolet source of 2537 A. to give a dosage of 3,000 watt seconds per square foot of surface area.

As shown in FIGURES 3 and 4, there can be applied printing indicia 18 to the saran coated polyethylene. It is important that the indicia be applied after the ultraviolet light treatment since otherwise the printing will not adhere satisfactorily. The printing can be applied in any conventional fashion, e.g., from a tank similar to tank 10 using appropriate rolls.

As the saran material there can be employed vinylidene chloride homopolymer or copolymers of vinylidene chloride with a minor amount of a copolymerizable material such as acrylonitrile, vinyl cholride, vinyl acetate, etc. Preferably, the copolymer contains 60 to 95% of vinylidene chloride units. The preferred copolymerizable material is acrylonitrile. Commercially available vinylidene chloride-acrylonitrile copolymers (such as Saran F–120, 200 cps. and Saran F–220 acetone soluble and having a viscosity of 60 cps. as a 20% solution in acetone) have been found satisfactory.

The polyethylene can be of high or low molecular weight, e.g., it can have a molecular weight of 7,000; 14,000; 21,000; 28,000; 35,000 or even higher. Likewise, the polyethylene can be of high, low or medium density. The invention also is operative with irradiated polyethylene. Thus, the polyethylene can be irradiated with electrons to an extent of from $2 \times 10^6$ rad to $100 \times 10^6$ rad, preferably about $8 \times 10^6$ rad to $12 \times 10^6$ rad. The irradiated polyethylene film can be unstretched or uniaxially stretched. Preferably, however, it is biaxially oriented. Irradiation of polyethylene followed by uniaxial or biaxial orientation is disclosed in Rainer et al. Patent No. 2,877,500 and Baird et al. Patent No. 3,022,543.

The polyethylene can be in the form of film, tubing, bottles, container closures, etc. Polyethylene film of 1 mil, 2 mil, 3 mil and 6 mil thickness have been successfully coated with saran followed by the ultraviolet light treatment to improve adherence. In order ot retard the transmission of gases and organic fluids, e.g., essential oils, through the polyethylene the saran coating is preferably at least 0.1 mil thick. There is normally no need to employ a heavier coating of the relatively expensive saran although saran coatings of 0.5 mil and more can be applied. Either one or both sides of the polyethylene can be coated with saran.

The ultraviolet light usually does not have a wave length above 3900 A.

The time of ultraviolet light treatment can vary from less than a second to an hour or more. In general the more intense the source of light the shorter the time of treatment. Thus, utilizing three 30 watt ultraviolet lamps with 85% of the light having a wave length of 2537 A. (although some of the light had a wave length as low as 2100 A. as evidenced by the odor of ozone) good adhesion was obtained when the lamps were placed ½ inch from the Saran F-120 coated polyethylene with an exposure time of 1 hour to give a dosage of about 1350 watt seconds per square foot. Similarly, when using a 3,000 watt, 1500 volt, 2 amp. clear quartz vapor lamp (4' x ½" Uviarc 37 of General Electric) having a wave length of 2537 A. good adhesion of the Saran F-120 to polyethylene was obtained when the lamp was placed at a distance of 6 inches for a time of 5 seconds or less. Under these latter conditions the radiation intensity was 1,000 watts per square foot of polyethylene film.

The process can be carried out intermittently or in continuous fashion. When employing high intensity ultraviolet sources it is desirable to appropriately cool the saran coated polyethylene to avoid overheating.

The ultraviolet light irradiation can be carried out either while the polyethylene is still wet with the solvent for the saran or after removal of the solvent by drying. In some cases the adhesion of the saran to the polyethylene is improved by the presence of a ketone solvent such as acetone or methyl ethyl ketone. This was found to be so particularly when the saran coating had been air dried on the polyethylene for several months and rewet with solvent immediately before irradiation. The improved adhesion was noted even if the solvent were only applied to the side which did not have the saran coating. It has also been observed that the adhesion is improved if hydrogen peroxide is included in the saran composition applied to the polyethylene.

Adhesion of the saran to polyethylene was tested by several methods. In the "Scotch Tape Test" Scotch brand tape was pressed on the saran coated side of the polyethylene film with as firm thumb pressure as possible and was then pulled off with as quick and hard a pull as possible.

In the "flex" test the degree of adhesion was a test for resistance to flexing. The coated film was held between the thumb and forefinger of both hands and flexed rapidly back and forth until the saran coating was loosened. The number of flexes necessary to effect loosening is an indication of adhesion. Coatings of saran applied to untreated film were loosened in less than 10 flexes, while some of the saran coatings applied after the ultraviolet light treatment according to the invention resisted more than 800 flexes and finally wore off rather than loosening. Furthermore, they could not be removed by Scotch Tape no matter how vigorously applied and jerked off. Present day commercially saran coated polyethylene films usually withstand approximately 70 flexes before loosening.

In no case did pretreatment of polyethylene film with ultraviolet light increase the adhesion of a saran coating or of printing inks to the polyethylene.

A sample of 3 mil polyethylene which had been coated with Saran F-120 some months previously and which showed complete lack of adhesion in the Scotch Tape and flex tests was irradiated dry for 45 minutes using three 30 watt Westinghouse sterilamps #782L 30 to give a dosage of 1000 watt seconds per square foot. The emitted radiation of each of these lamps was 5 watts; 85% of the light from the lamps had a wave length of 2537 A. Some of the light had a wave length as low as 2100 A. as demonstrated by the odor of ozone given off. Adhesion was noticeably improved by the ultraviolet light treatment.

Other pieces of the same 3 mil saran coated polyethylene film were brushed with methyl ethyl ketone and acetone, respectively, on the coated side and then irradiated with the three Westinghouse sterilamps for 45 minutes. Adhesion was so complete that the coating could not be pulled off with Scotch Tape and resistance to flexing was tremendously increased. The results with acetone were somewhat superior to those obtained with methyl ethyl ketone. Even when the polyethylene was brushed with the solvent on the side opposite the saran coating adhesion was noticeably better than that of the dry-irradiated sample. The effect of the ultraviolet light and solvents apparently penetrates through the polyethylene.

The effect of the ultraviolet light treatment was lost when black printing was interposed between the polyethylene film and a Saran F-120 coating which was subsequently applied from methyl ethyl ketone solution.

It has been observed that for very best results the polyethylene film should be pretreated, e.g., by an oxidizing gas flame or by corona discharge or other oxidizing agent prior to applying the saran. However, satisfactory results are obtained even without such pretreatments.

Using the three Westinghouse sterilamps to irradiate Saran F-120 coated 3 mil polyethylene film good adhesion was obtained when the film was ½ inch from the lamps. Excellent adhesion was also obtained as previously set forth when utilizing the ultraviolet light treatment for 45 minutes (a dosage of 1000 watt seconds per square foot), and even when utilizing times of treatment of 30 minutes (a dosage of 675 watt seconds per square foot), there was a substantial increase in adhesion over the controls. With 15 minutes of the ultraviolet light treatment (a dosage of 350 watt seconds per square foot) there was some improvement over the controls.

It was found that when polyethylene film of 3 mil thickness was coated with Saran F-120 and thereafter irradiated with the sterilamps for 1 hour at ½ inch (a dosage of 1350 watt seconds per square foot) that the coating could not be lifted in the Scotch Tape test and the flex resistance was over 800. This was true whether or not the polyethylene had been flame treated prior to coating with the saran. Using the sterilamps at a distance of 9/16 inch with as little as 12 minutes of the ultraviolet irradiation (a dosage of 280 watt seconds per square foot) with the Westinghouse sterilamps, there was excellent adhesion in some areas. The results with various samples of polyethylene coated with about 0.1 mil of Saran F-120 utilizing the three 30 watt Westinghouse sterilamps for 1 hour (a dosage of 1350 watt seconds per square foot) are given in Table 1. The "wet" column indicates that the saran coated sample was irradiated with ultraviolet light as soon after coating as possible. The "dry" column indicates that the coated sample was permitted to hang in air overnight before the ultraviolet light treatment.

*Table 1*

| Sample | Type of Polyethylene | Wet Scotch Tape | Flex | Dry Scotch Tape | Flex |
|---|---|---|---|---|---|
| 1 | low density untreated 3 mil. | lifted hard | 220 | lifted | 200 |
| 2 | low density flame treated 3 mil. | would not lift. | 800 (approximate). | would not lift. | 270 |
| 3 | low density 1 mil (untreated). | would not lift with slow pull. | 270 | would not lift with slow pull. | 200 |
| 4 | low density 2 mil untreated. | would not lift. | damaged 180. | lifted in one direction. | 210 |
| 5 | low density 6 mil untreated. | strips with difficulty. | 210 | would not lift. | over 800 |
| 6 | Super Dylan polyethylene 2 mil. | would not strip with slow pull. | 140 | would not strip with slow pull. | 60 |

It was observed that the samples which showed the highest degree of adhesion retained this same degree of adhesion after as long as 3 months. The samples which had the poorest adhesion showed progressive decline in adhesion with time. The polyethylene which had been flame treated before coating with the saran after a period of 3 months from the ultraviolet light treatment still could not be removed by the most stringent Scotch Tape test and had a resistance to flex of over 800. With comparable saran coated polyethylene which did not receive the flame treatment the coating could not be lifted and the flex resistance was over 800 four weeks after the ultraviolet irradiation. At 3 months the coating still could not be lifted but resistance to flex had dropped to 300.

In contrast to the results obtained above when polyethylene film was irradiated with the three 30 watt Westinghouse sterilamps at a distance of ½ inch and then coated with Saran F-120 the ultraviolet light pretreatment did not increase the adhesion of the coating to the film over that exhibited by untreated film with times of irradiation of 1 minute, 2 minutes, 5 minutes, 10 minutes, 1 hour, 15½ hours and 15¾ hours. Such irradiation was thus to an extent of from 35 to 21,250 watt seconds per square foot. These experiments established the criticality of utilizing the ultraviolet light irradiation after coating the polyethylene with the saran.

Black "Flexotuf" ink obtained from International Printing Ink was diluted about 20% by volume with a solvent supplied by the manufacturer. This ink adhered very well to flame treated polyethylene but did not adhere at all to the untreated film. Samples of untreated polyethylene were irradiated with the three sterilamps at ½ inch for 3, 5, 7, 15, 30 and 45 minutes before inking, i.e., for dosages of about 50 to 1000 watt seconds per square foot. In no case was ink adhesion improved over the untreated control. In another test the ink was applied to polyethylene film which was subsequently coated with Saran F-120 and then irradiated at ½ inch for 45 minutes (a dosage of 1000 watt seconds per square foot) with the three sterilamps. Both the Saran F-120 and the ink were easily removable by the Scotch Tape test. These tests also establish the fact that ultraviolet light irradiation of polyethylene alone does not improve its adherence to subsequently applied printing ink or saran.

The use of the Westinghouse sterilamps established the fact that subsequent ultraviolet light treatment could be employed to improve the adherence of saran to polyethylene. In order to make the process more attractive commercially, however, more powerful light sources with which shorter times of treatment are preferably employed. In the following examples the ultraviolet light source was a 3,000 watt, 1500 volt, 2 amp., clear quartz mercury vapor lamp (4' x ½", Uviarc-37, General Electric) equipped with a transformer. There was also provided a speculum aluminum sheet (40 mil thick) shaped into a parabola (6" high x 53½" long with a 7⅝" base). The parabola had a 3" latus rectum and a focus ¾" from the apex. The Uviarc-37 ultraviolet lamp was mounted at the focus of the parabolic reflector. Cooling of the parabolic reflector and lamp was accomplished by a fan which also served to vent the gaseous byproducts, e.g., ozone and the oxides of nitrogen. The radiant flux of irradiation at 2537 A. at a distance of 6 inches from the Uviarc-37 lamp was 1,000 watts per square foot. In order for the lamp to reach maximum intensity it should be warmed up for 3 to 5 minutes. Temperatures of 100-120° C. at 6 to 8 inches from the Uviarc-37 lamp were noted as was some irradiation in the visible range as well as infrared irradiation.

Samples of polyethylene about 6 inches wide and up to 3 feet long were attached by Scotch Tape to an aluminum plate which was slid under the parabola and removed at a given time interval.

Two mil samples of a low density polyethylene (Alathon 14, molecular weight 20,000, density 0.916) and of a high density polyethylene (Grex, density 0.96) were coated with 15% acetone solutions of Saran F-220 (copolymer of a major amount of vinylidene chloride and a minor amount of acrylonitrile). The coatings were about 0.1 mil. The samples were irradiated with Uviarc-37 lamp under the conditions just described within 5 minutes of the coating application. The samples were at a distance of 6 to 8 inches from the ultraviolet light source. Adhesion of the saran coatings was tested by the following Scotch Tape test. Half a strip of Scotch Tape (cellophane tape) about 3" long was pressed to the coated surface. The other half was used by the operator to pull the Scotch Tape from the film. A rough evaluation of the adhesion was made with regard to the manner in which the Scotch Tape was pulled from the coating and whether or not any coating was removed during this operation. The following ratings were applied.

Very good—no coating pull off when tape was ripped off or pulled slowly.

Good—no coating pull off when tape was pulled off slowly but some pull off when tape was ripped off.

Fair—complete or nearly complete pull off when tape was ripped off. Some pull off when tape was pulled off slowly.

Poor—complete pull off.

Evaluation of the ultraviolet irradiated Saran F-220 coatings is given in Table 2 for various times of treatment.

Table 2

| Sample | Time (seconds) | Watt Sec./Ft.$^2$ | Adhesion |
|---|---|---|---|
| Alathon 14 | 5-10 | 5,000-10,000 | Fair-Poor. |
|  | 10-15 | 10,000-15,000 | Good. |
|  | 30 | 30,000 | Very Good. |
| Grex (opaque) | 5-10 | 5,000-10,000 | Do. |
|  | 10-15 | 10,000-15,000 | Do. |
| Grex (clear) | 5-10 | 5,000-10,000 | Good. |
|  | 10-15 | 10,000-15,000 | Very Good. |

It was also observed that the coated irradiated opaque Grex had visibly decreased haze and improved gloss. The haze of the Grex as measured with a Hunter Haze meter was as follows:

Grex, Saran F-220 coated, irradiated (10 seconds) 71.2%.

Grex, Saran F-220 coated, unirradiated 74.4%.

Grex, uncoated, unirradiated 88.6%.

Samples of unpretreated, corona discharge pretreated, flame pretreated and flame and corona discharge pretreated polyethylene (Spencer Poly-eth No. 2205) were hand coated with a 15% solution of Saran F-120, 200 cps. in a mixture of 3 parts methyl ethyl ketone and 1 part acetone and with a 15% solution of Saran F-220 acetone. The samples were irradiated for given lengths of time 7 inches from the 3,000 watt Uviarc-37 ultraviolet source. The adhesion of the ultraviolet irradiated samples was checked with the Scotch Tape test described previously in connection with the 2 mil Alathon 14 and Grex samples. The results obtained are set forth in Table 3.

Table 3

Saran F-120, 200 cps. coated

| Film | Adhesion after ultraviolet exposure (seconds) | | | | | |
|---|---|---|---|---|---|---|
|  | 0 | 1 | 2 | 3 | 4 | 5 |
| Polyethylene— unpretreated | Poor | Fair | Good | Good | Good | Very Good. |
| Polyethylene— flame pretreated | do | Good | Very Good. | Very Good. | Very Good. | Do. |
| Polyethylene— corona discharge pretreated | do | Fair | Good | Good | Good–Very Good. | Do. |
| Polyethylene— flame and corona discharge pretreated | Fair | Very Good. | Very Good. | Very Good. | Very Good. | Do. |

SARAN F-220

| | | | | | |
|---|---|---|---|---|---|
| Polyethylene—unpretreated | Poor | Poor | Fair | Good | Very Good | Very Good. |
| Polyethylene—flame pretreated | ---do--- | Fair | Good | ---do--- | ---do--- | Do. |
| Polyethylene—corona discharge pretreated | ---do--- | ---do--- | ---do--- | ---do--- | ---do--- | Do. |
| Polyethylene—flame and corona discharge pretreated | ---do--- | Good | Very Good | Very Good | ---do--- | Do. |

In Table 3 an exposure for one second was equivalent to about 700 watt seconds per square foot, an exposure for two seconds was equivalent to about 1400 watt seconds per square foot, an exposure for three seconds was equivalent to about 2100 watt seconds per square foot, an exposure for four seconds was equivalent to about 2800 watt seconds per square foot, and an exposure for five seconds was equivalent to about 3500 watt seconds per square foot.

Saran (F-220) coated polyethylene (Spencer Poly-eth No. 2205) as well as uncoated polyethylene (Spencer Poly-eth No. 2205) had Flexotuf Blue and Flexotuf White printing inks (International Printing Ink) applied thereto and were irradiated with the 3000 watt Uviarc-37 ultraviolet source using the following orders of procedure.

(1) Coated—irradiated—printed.
(2) Printed—coated—irradiated.
(3) Coated—printed—irradiated.
(4) Printed—irradiated—coated.

Excellent printing ink adhesion was obtained (measured by the Scotch Tape test) where order 1 of operation was employed for times of treatment up to 15 seconds (a dosage of 15,000 watt seconds per square foot) or even less. However, with as much as 15 seconds of the ultraviolet treatment no improvement of adhesion was obtain with orders 2, 3, and 4. With order 2, yellowing of the saran caused the white ink to appear buff colored.

When (Spencer Poly-eth No. 2455) polyethylene was coated with Saran F-120 as a 15% solution in methyl ethyl ketone and acetone solvent and then irradiated with the 3000 watt Uviarc ultraviolet source the adhesion was Poor with no irradiation, Good with one second irradiation (1000 watt seconds per square foot) and Very Good with 2 seconds of irradiation (2000 watt seconds per square foot) measured by the Scotch Tape Test. In contrast when the same polyethylene was given a pretreatment with corona discharge before coating with the Saran F-120 the adhesion was Poor with no irradiation, Good–Very Good with 1 second irradiation (1000 watt seconds per square foot) and Very Good with 2 second irradiation (2000 watt seconds per square foot).

While the heat sealability of saran-coated polyethylene which has received ultraviolet irradiation is not as good as uncoated polyethylene it is considerably superior to the heat sealability of the saran-coated polyethylene which has not received the ultraviolet treatment. This is shown in the following examples.

Two-mil Alathon 14 polyethylene was hand coated with an acetone solution containing 15% of Saran F-220. The coated samples were ultraviolet irradiated with the 3000 watt Uviarc for 10 seconds to give a dosage of 10,000 watt seconds per square foot. The films were then heat sealed, coated surface to coated surface at 310° F. and 390° F. for intervals of ½, 1, 2, and 5 seconds. The samples were aged for 24 hours at 110–120° F. and the seal strength measured. Saran F-220 coated, unirradiated two-mil Alathon 14 polyethylene controls were also run. The results are set forth in Table 4.

*Table 4*

SARAN F-220 TO SARAN F-220 SEALS ON COATED-POLYETHYLENE

| Sample | Sealing Temp. (° F.) | Dwell Time (secs.) | Seal Strength (lbs./linear inch) | Aging Temp. (° F.) |
|---|---|---|---|---|
| Coated, irradiated | 310 | ½ | 0.86 | 110–120 |
| Do | 310 | 1 | 0.77 | 110–120 |
| Do | 310 | 2 | 0.96 | 110–120 |
| Do | 310 | 5 | 1.4 | 110–120 |
| Coated, unirradiated | 310 | ½ | 0.1 | 110–120 |
| Do | 310 | 2 | 0.25 | 110–120 |
| Coated, irradiated | 390 | 2 | 1.2 | 110–120 |
| Do | 390 | 5 | 0.9 | 110–120 |

Samples of Saran F-120 (1000 centiposes grade) coated polyethylene were irradiated at dosages of 35, 350, 1000 and 1350 watt seconds per square foot with three 30 watt sterilamps at a distance of ½ inch from the lamps and exposure time intervals of 1.5, 15, 45 and 60 minutes.

The samples were prepared by first making a 10% solution of the Saran F-120 in methyl ethyl ketone. Then one side of each of the 1" x 6" samples of Alathon 14 polyethylene film was masked with tape. The samples were then dipped into the solution and allowed to air dry by hanging vertically for 11 minutes. Irradiation was then carried out in the manner described. After irradiation the samples were extracted with methyl ethyl ketone in a Soxhlet apparatus for four hours and the amount of saran extracted was measured. A 100% coating loss indicated no adhesion to the polyethylene. The results are shown in Table 5.

*Table 5*

| Dosage Time (Minutes) | Dosage (Watt-Sec./Ft.$^2$) | Average Coating Loss, Percent |
|---|---|---|
| 0 | 0 | 100 |
| 1.5 | 35 | 100 |
| 15 | 350 | 66 |
| 45 | 1,000 | 60 |
| 60 | 1,350 | 45.2 |

The procedure described in connection with Table 5 was repeated using a General Electric Mazda Sunlight Lamp Type S-4 at a distance of 6" from the lamp in place of the sterilamp as the source of ultraviolet light. There was 100% coating loss at dosage times of 1.5, 15 and 45 minutes and at 20 hours. The amount of irradiation afforded by the Sunlight lamp was far more than the maximum found to be suitable for the present invention.

It has also been found that the use of hydrogen peroxide in the saran coating solution reduces the time required to obtain good adhesion during the ultraviolet light treatment. Thus in one experiment polyethylene film was coated with a 15% solution of Saran F-120 in methyl ethyl ketone containing 0.5 ml. of aqueous 30% hydrogen peroxide per 25 grams of the saran solution. The coated polyethylene was then treated with ultraviolet light using the 3000 watt Uviarc lamp. In the Scotch Tape adhesion test the adhesion was Good after 2 seconds and Very Good after 4 seconds. In the control omitting the hydrogen peroxide from the saran solution the adhesion was Poor after 2 seconds, Fair after 3 seconds, Good after 4 seconds and Very Good after 5 seconds.

In another example, 2 mil Alathon 14 which had been irradiated to an extent of 12 megarad and then stretched 350% longitudinally and 350% laterally was coated with a solution of Saran F-120 in methyl ethyl ketone to provide a saran coating 0.2 mil thick. After drying the saran coated irradiated biaxially oriented polyethylene was treated with the 3000 watt Uviarc ultraviolet lamp for 5 seconds. The saran coating had greatly improved adhesion to the polyethylene as compared with the saran coated irradiated biaxially oriented polyethylene which had not received the ultraviolet treatment.

What is claimed is:

1. A method of improving the adhesion of a vinylidene chloride polymer to polyethylene comprising subjecting polyethylene which has been coated with a solution of vinylidene chloride polymer in a solvent and the solvent removed to an extent sufficient to form a coating of the vinylidene chloride polymer on the polyethylene to ultraviolet light to an extent of between 280 and 30,000 watt seconds per square foot of surface area.

2. A method according to claim 1 wherein the treatment is to an extent of at least 1000 watt seconds per square foot of surface area.

3. A process according to claim 1 wherein the vinylidene chloride polymer is a copolymer of vinylidene chloride with a minor amount of acrylonitrile.

4. A process according to claim 1 wherein the polyethylene is irradiated biaxially oriented polyethylene, the irradiation being to an extent of at least $2 \times 10^6$ rad.

5. A process according to claim 4 wherein the vinylidene chloride polymer is a copolymer of a major amount of vinylidene chloride and a minor amount of acrylonitrile.

6. A method according to claim 1 wherein the polyethylene is pretreated with an oxidizing agent prior to applying the vinylidene chloride polymer.

7. A method according to claim 1 wherein the polyethylene is pretreated with an oxidizing flame prior to applying the vinylidene chloride polymer.

8. A method according to claim 1 wherein the polyethylene is pretreated with corona discharge prior to applying the vinylidene chloride polymer.

9. A method according to claim 1 wherein printing indicia are applied to the coated polyethylene subsequent to the ultraviolet light treatment.

10. A method according to claim 1 wherein the polyethylene is pretreated with both an oxidizing flame and corona discharge prior to applying the vinylidene chloride polymer.

11. A method according to claim 1 including the further step of drying to remove any remaining solvent.

12. A method of improving the adhesion of a copolymer of a major amount of vinylidene chloride and a minor amount of acrylonitrile to polyethylene comprising applying the copolymer from solution in a ketone to the polyethylene, drying to an extent sufficient to form a coating of said copolymer on the polyethylene and while the polyethylene is still wet with the solvent treating the polyethylene with ultraviolet light to an extent of between 280 and 30,000 watt seconds per square foot of surface area.

13. A method according to claim 12 wherein the ketone solution also contains hydrogen peroxide.

14. A method according to claim 12 including the further step of drying to remove the solvent.

15. A method of improving the adhesion of vinylidene chloride polymer to polyethylene comprising applying the vinylidene chloride polymer from a solution in a ketone to the polyethylene, drying to an extent sufficient to form a coating of said copolymer on the polyethylene and while the polyethylene is still wet with the solvent treating the polyethylene with ultraviolet light to the extent of between 280 and 30,000 watt seconds per square foot of surface area.

16. A method of improving the adhesion of a vinylidene chloride polymer to polyethylene comprising treating polyethylene which has been solution coated with a vinylidene chloride polymer and in which the solvent has been removed to an extent sufficient to form a coating of the vinylidene chloride polymer on the polyethylene with ultraviolet light to the extent of between 280 and 30,000 watt seconds per square foot of surface area.

17. A process according to claim 16 wherein the vinylidene chloride polymer is a copolymer of a major amount of vinylidene chloride and a minor amount of acrylonitrile and after the ultra-violet light treatment the residual solvent is removed by drying.

References Cited in the file of this patent

UNITED STATES PATENTS

| | | |
|---|---|---|
| 2,413,973 | Howk et al. | Jan. 7, 1947 |
| 2,450,503 | Drummond | Oct. 5, 1948 |
| 2,484,529 | Roedel | Oct. 11, 1949 |
| 2,628,214 | Pinkney et al. | Feb. 10, 1953 |
| 2,801,446 | Wolinski | Aug. 6, 1957 |
| 2,845,541 | Berry et al. | July 29, 1958 |
| 2,877,500 | Rainer et al. | Mar. 17, 1959 |
| 2,878,519 | Wolinski | Mar. 24, 1959 |
| 2,968,576 | Keller et al. | Jan. 17, 1961 |
| 2,986,507 | Steck | May 30, 1961 |
| 3,022,543 | Baird et al. | Feb. 27, 1962 |

FOREIGN PATENTS

| | | |
|---|---|---|
| 801,479 | Great Britain | Sept. 17, 1958 |
| 810,169 | Great Britain | Mar. 11, 1959 |

OTHER REFERENCES

Bloyer: "Treating Polyethylene for Printing," "Modern Plastics," July 1955, pages 105, 106, 108 and 205.

"Saran Resin F-120," Dow Chem. Co., November 1954, 20 pages, page 18.